United States Patent [19]

Smith et al.

[11] Patent Number: 5,259,430
[45] Date of Patent: Nov. 9, 1993

[54] CONFIGURATION FOR DEMOUNTABLE WHEEL RIM FLANGE/SPLIT LOCKRING ASSEMBLIES

[75] Inventors: Donald H. Smith, Cuyahoga Falls; Richard J. Frank, Akron, both of Ohio

[73] Assignee: Aircraft Braking Systems Corporation, Akron, Ohio

[21] Appl. No.: 799,231

[22] Filed: Nov. 27, 1991

[51] Int. Cl.$^5$ .............................................. B60B 25/18
[52] U.S. Cl. .................................... 152/410; 152/409; 301/35.3
[58] Field of Search ............... 152/409, 410, DIG. 10; 301/95-98, 29.2, 35.3

[56] References Cited

U.S. PATENT DOCUMENTS

| | | | |
|---|---|---|---|
| 2,856,980 | 10/1958 | Trevaskis | 152/410 |
| 3,027,980 | 4/1962 | Burkman | 188/79 X |
| 3,118,485 | 1/1964 | Lejeune | 152/410 |
| 3,783,927 | 1/1974 | Verdier | 152/409 |
| 4,003,421 | 1/1977 | Lejeune | 152/409 |
| 4,635,695 | 1/1987 | Frank et al. | 152/410 |
| 4,757,851 | 7/1988 | Van Den Abeele | 152/410 |
| 4,911,216 | 3/1990 | Yamoto et al. | 152/410 |
| 5,086,821 | 2/1992 | Russell et al. | 152/410 |

Primary Examiner—Russell D. Stormer
Attorney, Agent, or Firm—L. A. Germain

[57] ABSTRACT

This invention provides an improved aircraft wheel rim wherein a demountable tire bead flange has an annular chamfer within the outboard end of the flange bore, and a split lockring which cooperates to maintain the flange on the wheel rim body has an outer surface chamfer which matches the flange bore chamfer, the angle of the flange bore and lockring surface chamfers being determined by the coefficient of friction of the material comprising the wheel rim assembly such that a compressive wedge-locking load force exists at the chamfer joint as may be imposed by inflation of a rim-mounted tire.

6 Claims, 2 Drawing Sheets

CONFIGURATION FOR DEMOUNTABLE WHEEL RIM FLANGE/SPLIT LOCKRING ASSEMBLIES

FIELD OF THE INVENTION

This invention pertains to aircraft wheel assemblies wherein an outboardly positioned tire bead flange of a wheel rim is designed to be demountable and separable from the rim body such as to facilitate mounting and demounting of an inflatable tire. The demountable bead flange is secured on the rim body by a split lockring which is seated within an annular radial groove proximate the outboard edge of the rim body.

More specifically, this invention pertains to a unique configuration for a demountable bead flange and split lockring assembly such as to provide a wedge-locking load force at the flange bore and lockring surface joint which operates to eliminate fretting within the annular groove in the rim body causing possible fracturing and an early retirement of the wheel rim.

BACKGROUND OF THE INVENTION

Wheel rims for various type aircraft may include a rim body having an integral inboardly positioned tire bead flange, a demountable outboardly positioned tire bead flange, a split lockring seated within an annular radial groove in the rim body and, a means associated with the lockring to maintain it on the wheel rim. In wheel rim assemblies of this type, a deflated tire is firstly mounted on the rim body and it is followed by the demountable bead flange which is moved inboardly on the rim body such that the split lockring may be seated within the annular groove provided for it proximate the outboard edge of the rim body. Upon inflation of a mounted tire, the demountable bead flange is moved outboardly on the rim and into forceful engagement with the split lockring. Alternatively, when the tire is to be demounted from the rim, it is firstly deflated and the demountable bead flange is moved inboardly to disengage the lockring. The split lockring may then be removed from within its mounting groove and the demountable bead flange and deflated tire removed from the rim body in the outboardly direction.

It is well-known in the industry that, in the particular circumstance of a tire blowout when traveling at a high rate of speed, the outboardly positioned tire bead tends to work inboardly on the rim and this allows the demountable bead flange to follow in the same direction. In this situation, a forceful engagement as between the flange and lockring is lost and the lockring is subject to being thrown off of the rim body by the high centrifugal forces which are present. As these type wheel rims are used for aircraft applications, the above-described situation of tire blowout creates a very serious hazard to aircraft operations. Solutions to the problem of lockring throw-off are disclosed in the prior art as exemplified in U.S. Pat. Nos. 4,635,695 and 4,683,930 wherein various type wire devices are applied to the split lockring to maintain it on the rim body when forceful engagement with the demountable bead flange is lost.

It should be made clear that, with respect to the prior art patents referenced above, the split lockring is termed a "retaining ring" inasmuch as that is the manner that these have been catalogued by various agencies. The terminology "retaining ring", however, is found to be used generally and generically for a wide range of split ring fasteners as these are known and used in the mechanical arts. In view of this, the terminology "retaining ring" will not be used in this specification for the split rings of the type which are used for securing a demountable tire bead flange on a wheel rim body. The terminology "split lockring" will be used hereinafter for such wheel rim lockrings and the terminology "retaining ring" will only be used to refer to any of the various type spring metal split rings as these are known and used in the fastening arts.

To continue, there is a particular aircraft application known in the industry as "high floatation tire application" wherein somewhat lower tire pressures are used. In this type application, the wheels of the landing gear are subjected to changing forces imposed by varying runway surfaces during taxi runs and turns as well as during takeoffs and landings. These varying forces result in tire pressure variations which act on the bead flanges of the wheel rim. It has been found that such pressure variations effect minute physical movements at the flange-lockring joint and this results in fretting action within the lockring mounting groove in the rim body. The fretting can result in cracks in the rim body which, while easily detected in a normal inspection, result in an early retirement of the wheel rim.

It is, therefore, in accordance with one aspect of the present invention an object to provide a demountable bead flange and split lockring assembly configuration which does not produce fretting within the lockring groove in the wheel rim body.

In accordance with another aspect of the invention it is an object to provide a configuration for a demountable bead flange and split lockring assembly wherein engagement between the two is characterized by a wedge-locking load force at the joint such as to eliminate any relative movement of the split lockring within its mounting groove.

According to another aspect of the present invention it is an object to provide a configuration for a demountable bead flange and split lockring assembly wherein the bore of the flange transitions into a chamfer at its outboard end and the split lockring has an outer surface chamfer which matches the chamfer in the flange bore such that a compressive wedge-locking force exists between the two at the joint in the normal operation of the wheel rim.

In accordance with still another aspect of the invention it is an object to provide a demountable bead flange and split lockring assembly for a wheel rim characterized by bevelled interfacing surfaces of the flange bore and lockring surface which define an angle of not more than 30° with reference to an axis of the rim.

According to another aspect of the present invention it is an object to provide an improved configuration for a wheel rim demountable bead flange and split lockring assembly wherein a split retaining ring cooperates in combination with the assembly to effect a self-locking and pre-loaded annular joint between the members which maintains a wedge-lockup of the members.

SUMMARY OF THE INVENTION

The various objects and advantages of the present invention may be accomplished in an improved wheel rim which comprises a rim body having an integral inboardly positioned tire bead flange, a demountable outboardly positioned tire bead flange, a split lockring seated within an annular radial groove in the rim body, and a means to secure the lockring on the rim body, the improvement comprising: a demountable bead flange characterized by an annular chamfer within the outboard end of the flange bore; and, a split lockring characterized by an outer surface chamfer which matches the chamfer in the flange bore such as to produce a compressive wedge-locking load force at the chamfer joint as may be imposed by a tire inflation pressure acting on the flange through an outboard positioned tire bead.

BRIEF DESCRIPTION OF THE DRAWINGS

The present invention will best be appreciated and understood from a consideration of the following detailed description when taken in conjunction with the accompanying drawings, in the several figures in which like-reference numerals may be used to identify like elements or members and wherein.

DETAILED DESCRIPTION OF THE INVENTION

Figure 1:
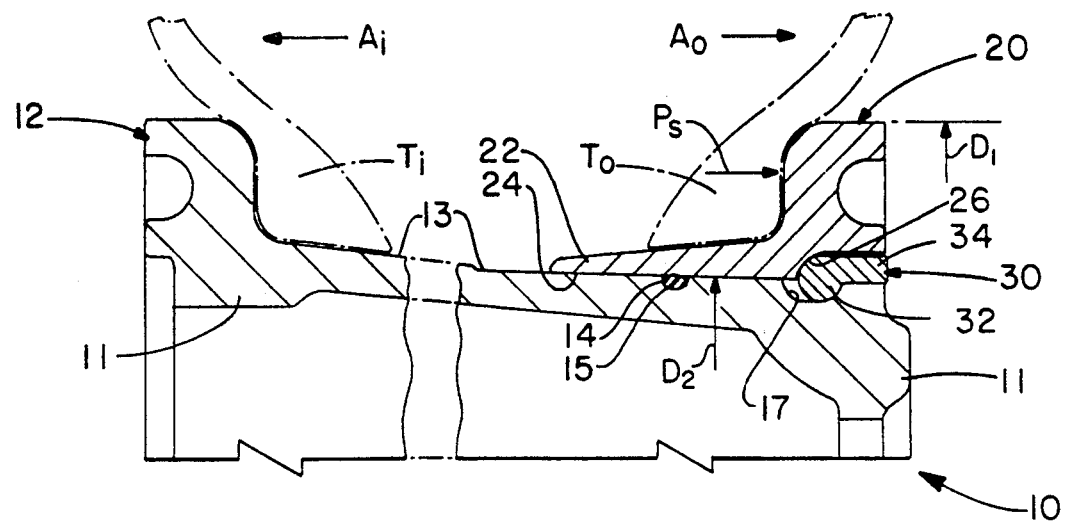
FIG. 1 is a partial cross-sectional view of a wheel rim showing a prior art configuration for a demountable tire bead flange and a split lockring assembly, the tire beads of a rim-mounted tire being illustrated in ghost dot-dashed lines for the purpose of the illustration.

Referring firstly to FIG. 1 of the drawings, a prior art wheel rim of a well-known configuration is generally indicated by reference numeral 10, the rim having a body 11 and designated inboardly and outboardly directions as may be determined by its mounting on an aircraft landing gear (not shown) and the directions are indicated by reference arrows $A_i$ and $A_o$ respectively. The wheel rim 10 will include an inboard positioned tire bead flange 12 which is formed as an integral part of the rim body 11 and, an outboard tire bead flange 20 which is demountable from the rim body 11 in the outboardly direction of arrow $A_o$. The tire beads of a rim-mounted tire (not shown) are illustrated in the figure via ghost dot-dashed lines as these may be positioned on the rim in a tire-inflated condition, the inboard tire bead being indicated at reference $T_i$ while the outboard tire bead is indicated at reference $T_o$.

The demountable bead flange 20 is an annular piece and it has a cylindrical body 22 which defines a bore 24 such that the flange is slidably received on the rim body 11 in the inboardly direction of arrow $A_i$. The leakproof integrity as between the flange bore 24 and the outer surface 13 of the rim body is maintained by a seal ring 14 received within an annular radial groove 15 in the rim body 11. The flange 20 is secured on the rim body 11 by way of a split lockring 30 positioned outboardly of the flange and seated within an annular radial groove 17 proximate the outboard edge of the rim body 11. The lockring 30 is conventionally characterized by an inboard substantially bulbous portion 32 which extends outboardly into a flat lip or flange portion 34. While the bulbous portion 32 is illustrated in the drawing as being substantially circular in transverse cross-section, it may as well exhibit other shapes which could function in this type of application. The particular shape illustrated is, of course, a well-known and proven configuration in this art.

As stated, the bulbous portion 32 of the lockring 30 is received and seated within an annular radially oriented groove 17 in the surface 13 of the rim body 11. In this respect also, the demountable bead flange 20 has an annular groove 26 in the outboard end of the flange bore 24 which is intended to engage the bulbous portion 32 of the split lockring 30 such that, when the flange is moved outboardly by a tire inflation pressure, a pressure force $P_S$ exists which acts on the flange through the outboard tire bead $T_o$. Thus, an abutting forceful engagement is effected as between the flange annular groove 26 and the bulbous portion 32 of the split lockring 30.

In a wheel rim 10 of the type illustrated in FIG. 1, a force $P_S$ acts through the projected area of the demountable bead flange 20 as defined by the flange diameters $D_1$ and $D_2$ indicated in the figure. Because the force $P_S$ is not constant but varies according to various loading affects on the wheel during operation, a relative movement may exist between the bulbous portion 32 of the lockring and the corresponding annular groove 26 in the flange 20. This movement results in fretting within the lockring groove 17 which is a cyclic action due to the varying forces which act primarily in the axial direction on the bulbous portion 32.

Figure 2:
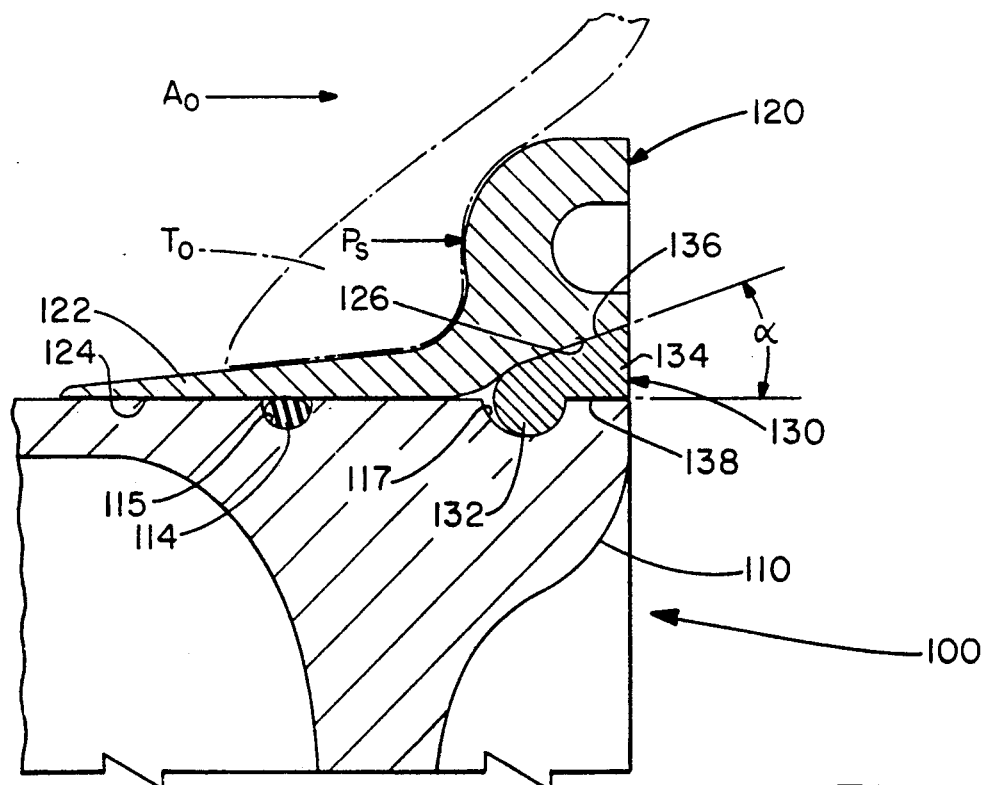
FIG. 2 is a partial cross-sectional view through but a portion of the outboard edge of a wheel rim illustrating a demountable bead flange and split lockring assembly in accordance with the present invention.

Referring now to FIG. 2 of the drawings, a solution to fretting was found and it is directed to a unique configuration for the demountable bead flange and split lockring assembly. A wheel rim according to the present invention is generally indicated at reference numeral 100 and it comprises a rim body 110 having an integral inboardly positioned tire bead flange (not shown) and, a demountable outboardly positioned tire bead flange 120. The demountable bead flange 120 has a body 122 which defines a flange bore 124 which is axially aligned with an axis (not shown) of the wheel rim 100 and the leakproof integrity between the flange bore 124 and the rim body 110 is provided by a seal ring 114 seated within an annular radial groove 115 in the rim body. A split lockring is generally indicated at reference numeral 130 and it is characterized by a bulbous portion 132 at its inboard end which extends outboardly into a flange portion 134. The lockring 130 is seated within an annular radial groove 117 in the rim body 110, the groove being located proximate the outboard edge of the rim body. The bulbous portion 132, while shown as being substantially circular in transverse cross-section, may exhibit any shape which will function in this application and, therefore, the invention is not considered limited to a particular transverse cross-section of the inboard end 132 of the lockring 130.

In accordance with this invention, the demountable bead flange 120 is characterized by its bore 124 transitioning into an annular chamfer or bevel 126 at its outboard end. In a transverse cross-section of the flange 120, the bevel 126 exhibits an angle "α" as may be defined with reference to an axis of the flange (not shown) which is an axis coincident with the axis of the wheel rim 100. Further in accordance with this invention, the split lockring 130 is characterized by a chamfered or bevelled outer surface 136 which also exhibits the angle "α" as this angle may be defined with reference to an axis (not shown) of the lockring 130, which axis is also coincident with the axis of the wheel rim 100. The bevelled surfaces 126 and 136 comprise a joint interface and both are at the same angle and, therefore, are matching interfacing surfaces. In this respect, a force $P_S$ acting outboardly on the flange 120 effects a wedge-locking load force at the flange-lockring joint and this force is distributed throughout the length of the bevelled surface interface. The force is a compressive load force which may be identified by the equation $$P_N = \frac{P_S}{\mu(\cos\alpha) + \sin\alpha}$$

wherein $P_S$ is the pressure force acting on the wheel rim flange 120, $\mu$ is the coefficient of friction for the metal comprising the wheel rim 100 and, $\alpha$ is the angle as may be defined by a straight line tangent to the outer surface of the split lockring bulbous portion 132 and a line parallel to an axis of the wheel rim. From this relationship it may be seen that, for an angle $\alpha = 45°$ and a coefficient of friction $\mu = 0.05$ for an all aluminum wheel assembly 100, the result is a compressive load force $P_N = 1.35 P_S$. At this high angle, the compressive load force $P_N$ is only about 35% more than the pressure force $P_S$ acting on the flange 120. This was found to be insufficient for eliminating any relative movement between the members which comprise the flange-lockring joint assembly and fretting may still exist within the lockring groove 117.

It was, however, found that as the angle $\alpha$ decreases the compressive load force at the joint increases remarkably. For example, when the angle $\alpha = 15°$, the compressive load force at the flange-lockring joint results in a $P_N = 3.26 P_S$ which is a 241% increase in the load force. Further, when the angle $\alpha = 10°$, the result is a compressive load force of $P_N = 4.49 P_S$ which is a 332% increase in the load force. In this respect, as the angle decreases to smaller acute angles, a limit is reached whereupon the load force at the flange-lockring joint is such as to cause the flange 120 to grow radially to an extent that it is forced off of the rim body 110 altogether. It was, however, found that when the wheel rim 100 had a rim body, demountable flange, and split lockring comprised of aluminum, the angle $\alpha$ should preferably be within the range of 15°-25°. It was further determined that, when the wheel rim had members comprised of titanium, the angle $\alpha$ should be within the range of 11°-20°. Further, it was also determined that when the wheel rim 100 had members comprised of a steel alloy, the angle $\alpha$ should preferably be within the range of 3°-10°. The angle $\alpha$, therefore, varies within the range of 3°-30 depending upon the coefficient of friction of the material which comprises the wheel assembly 100. This invention, therefore, intends to cover the angle $\alpha$ within the range of 3°-30° irrespective of the material comprising the wheel rim 100 and/or its coefficient of friction.

Figure 3:
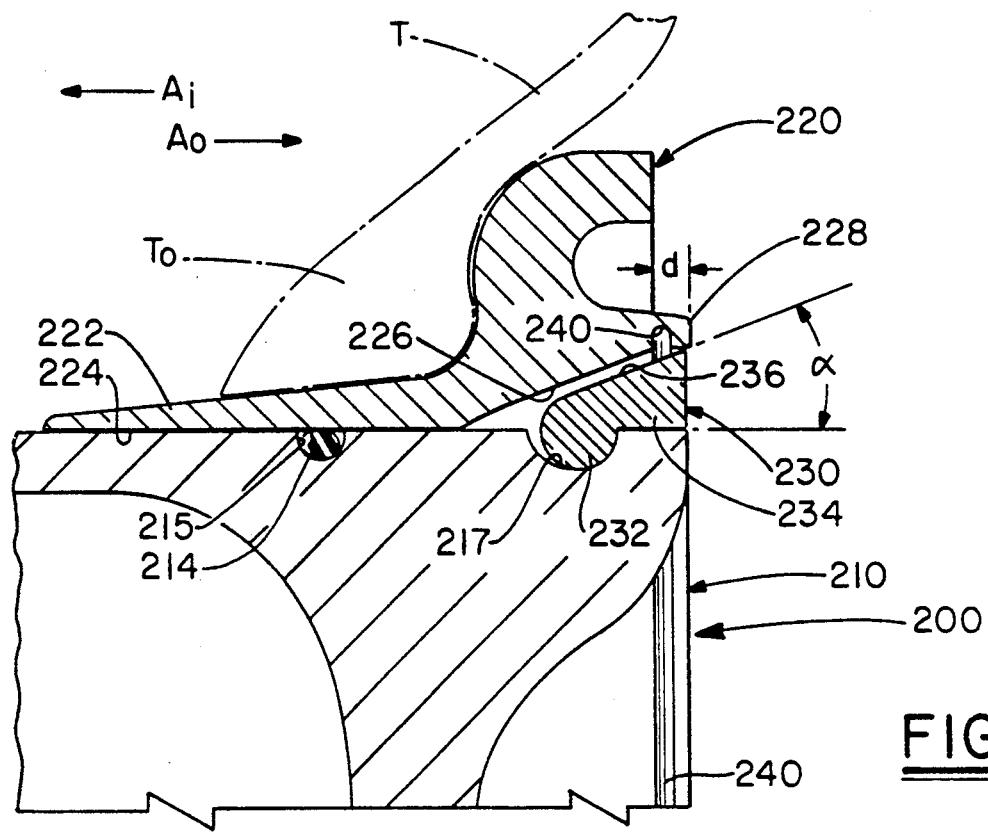
FIG. 3 is a cross-sectional view similar to FIG. 2 of the outboard edge portion of a wheel rim illustrating a preferred embodiment of the invention and the manner of assembling a tire (shown in ghost lines) on the wheel rim; and, FIG. 4 is a cross-sectional view showing the embodiment of FIG. 3 as it will be finally assembled for operation.
Figure 4:
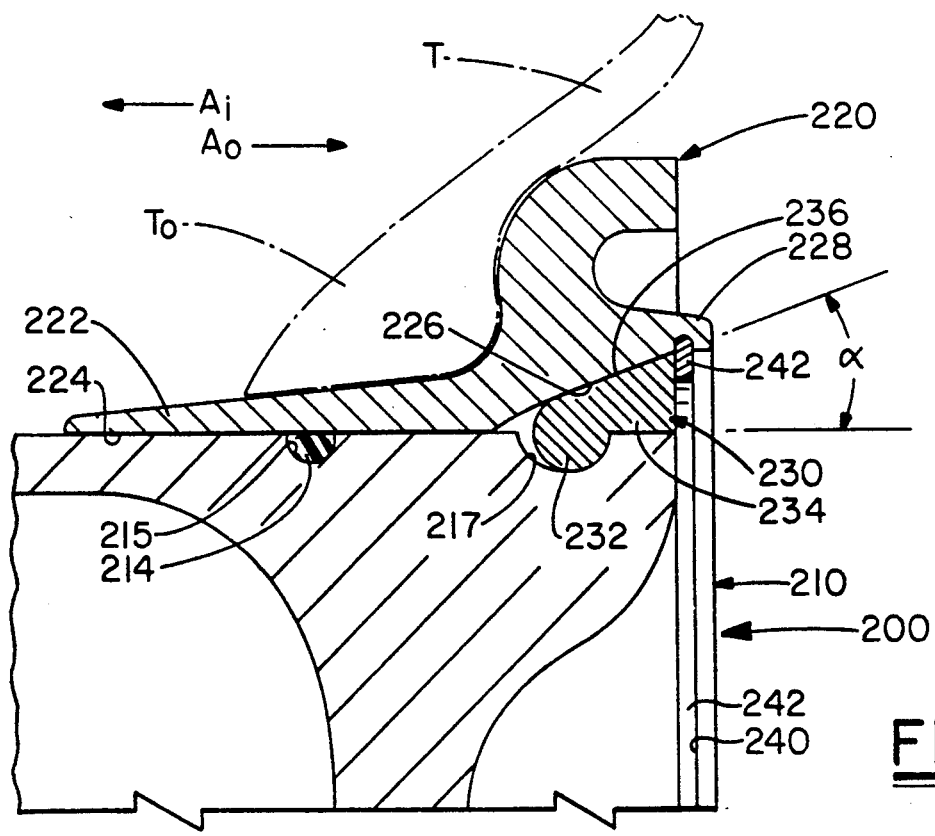

Referring now to FIGS. 3 and 4 of the drawings, a preferred embodiment of the invention is illustrated wherein a wheel rim assembly is generally indicated at reference numeral 200. The wheel rim 200 comprises a rim body 210 which has an integral inboardly positioned tire bead flange (not shown) and, a demountable outboardly positioned tire bead flange 220. The bead flange 220 is secured on the rim body by a split lockring 230 seated within annular radial groove 217 in the rim body. The leakproof integrity between the flange 220 and the rim body 210 is maintained by a seal ring 214 seated within an annular radial groove 215 in the rim body.

The split lockring 230 is characterized by an inboard bulbous portion 232 which is configured to seat within the annular radial groove 217 in the rim body and it extends outboardly into a flange portion 234. In similar manner to FIG. 2, the flange portion 234 is characterized by a chamfer or bevelled outer surface 236 which is at an angle $\alpha$ as may be defined by a straight line extending from the surface 236 and a line parallel to the axis of the rim.

The demountable bead flange 220 is characterized by a body 222 which defines a bore 224 extending outboardly to transition into an annular chamfer or bevel 226. The bevel 226 is also at the angle $\alpha$ which may be defined in transverse cross-section of the flange by a straight line extension of the bevelled surface 226 and a line parallel to the axis of the flange 220. In similar manner to FIG. 2, the flange and lockring bevelled surfaces 226 and 236 respectively are matching bevels to effect a compressive load force at the flange-lockring joint.

In addition, the demountable bead flange 220 is also characterized by an annular lip or flange 228 which extends the flange body 222 outboardly by an amount indicated at "d" in the drawing. The extension 228 has an annular radial slot 240 within the bore 224 and it is adapted for carrying an expandable split retaining ring 242 in conventional manner as shown in FIG. 4.

Mounting of an inflatable tire indicated at reference T in the drawing is accomplished by forcing the outboard tire bead $T_o$ inboardly on the rim body 210. The demountable bead flange 220 is then positioned on the rim body and it is forced inboardly such that the split lockring 230 may be seated within the annular radial groove 217 in the rim body. The mounted tire T is then inflated and the inflation pressure is increased to at least 1.5 times the normal tire pressure. Preferably, the inflation pressure will be increased to about 2.0 times the normal tire pressure which is still well below the burst pressure for these type of tires. In doing this, the flange extension 228 is moved at least a distance "d" such that the slot 240 is cleared outboardly of the rim body and the retaining ring 242 may be inserted into seated relationship within the slot 240. Once the retaining ring 242 is in the slot, the inflation pressure is reduced to a normal operating pressure for the particular tire.

The procedure described above, for the wheel rim configuration 200, results in an axial load force existing at the lockring 230 and retaining ring 242 interface. Thus, not only does a self-locking compressive wedge force exist at the bevelled joint between the flange 220 and the lockring 230 but also a preload force. For example, it was found that the compressive wedge force lockup at the bevelled joint is preloaded three to five times the force which exists absent the retaining ring 242. Thus, a multiplication of the wedge force lockup is realized and this very high force distribution does not allow any relative movement to exist which could contribute to fretting within the lockring groove 217. Furthermore, it was found that the demountable bead flange and split lockring maintained a wedge force lockup even in the event of tire blowout and an inboardly movement of the outboard tire bead $T_o$. This is, of course, a great safety advantage over the prior art configured flange-lockring assemblies.

While certain representative embodiments and details have been shown for the purpose of illustrating the present invention, it will be apparent to those skilled in this art that various changes or modifications may be made without departing from the spirit or scope of the invention.

What is claimed is:

1. In an aircraft wheel rim body having an integral inboardly positioned tire bead flange and an annular radial groove proximate its outboard end, an improved demountable and outboardly positioned tire bead flange and split lockring assembly comprising in combination:

a demountable bead flange body defining a cylindrical flange bore which transitions into an annular chamfer at its outboard end; and a split lockring having an inboard end shaped for seating engagement within the annular radial groove in the rim body and which extends outboardly into a flange defining a cylindrical bore for mounted engagement on the rim body and an outer annular surface chamfer for contacting engagement with the demountable bead flange chamfer;

the flange bore and lockring surface chamfers being matching angles within the range of 3°-25° as defined with reference to a rim axis and with respect to the coefficient of friction of the metal which comprises the demountable bead flange and lockring such that a compressive wedge-locking load force exists at the chamfer joint between the two upon inflation of a rim-mounted tire.

2. The wheel rim as claimed in claim 1 wherein the rim body, the demountable flange, and the split lockring are comprised of aluminum and the angle of the chamfers is within the range of 15°-25°.

3. The wheel rim as claimed in claim 1 wherein the rim body, the demountable flange, and the split lockring are comprised of titanium and the angle of the chamfers is within the range of 11°-20°.

4. The wheel rim as claimed in claim 1 wherein the rim body, the demountable flange, and the split lockring are comprised of a steel alloy and the angle of the chamfers is within the range of 3°-9°.

5. The wheel rim as claimed in claim 1 wherein the demountable bead flange has an annular radial slot within its bore proximate its outboard end; and a split retaining ring is seated within the slot such that the chamfer joint between the flange and lockring is preloaded with a compressive wedge-locking load force which is at least three times the load force which is present when the retaining ring is not seated within the slot.

6. The wheel rim as claimed in claim 5 wherein the preload compressive force is within the range of three to five times the load force which is present when the retaining ring is not seated within the slot.

* * * * *